3,213,149
METHOD OF PREPARING TELOMERS

Akira Takahashi, Kanagawa-ken, Noboru Mogi, Tokyo, and Hiroshi Takahama, Kanagawa-ken, Japan, assignors to Showa Denko Kabushiki Kaisha, Tokyo, Japan, a corporation of Japan
No Drawing. Filed Dec. 20, 1961, Ser. No. 160,923
Claims priority, application Japan, Mar. 1, 1961, 36/6,753
12 Claims. (Cl. 260—658)

This invention relates to a novel method of preparing telomers which is characterized in that the metal salt of an organic acid is used as the catalyst in preparing telomers using as the taxogen the ethylenic compounds, vinyl type compounds and diene compounds and as the telogen the compounds having an active halogen, such as carbon tetrachloride and chloroform or the compounds having an active hydrogen atom such as the alcohols, aldehydes, ketones, and organic acids.

Heretofore, the method of preparing polymers obtained from a monomer and a polymerization initiator which is derived from the chain-transfer reaction between free radicals formed from a catalyst and a compound referred to as telogens has been known, being referred to as telomerization; and the polymers obtained by telomerization is referred to as telomers.

And according to the conventional method, as the telogen generally the compounds having an active halogen atom, such as carbon tetrachloride and chloroform and the compounds having an active hydrogen atom, such as the alcohols, aldehydes, ketones and organic acids have been used, and as the catalyst, generally the organic peroxides such as benzoyl peroxide.

However, when telomers are prepared by using an organic peroxide as the catalyst, since for most of the organic peroxides, free radicals which participate in the reaction form in the vicinity of 100° C., it becomes of necessity that the reaction temperature of the polymerization system be raised to the vicinity of 100° C. or above, and in concomitance the pressure in the polymerization system must be raised. Consequently according to the conventional method of telomerization, there was a need for high temperature and high pressure, and thus the risk of explosion, etc., was unavoidable, as well as the difficulties arose during the operation.

We, however, have found a method in which telomerization can be carried out even at a low temperature and low pressure without using at all an organic peroxide as the catalyst as in the conventional method.

Namely, according to the present invention the metal salts of an organic acid, for example, the salts of metals selected from those in the group I–VIII of the periodic table such as lithium, sodium, potassium magnesium, calcium, aluminum, copper, iron, nickel, cobalt, lead, zinc, tin, titanium, zirconium, vanadium, chromium, molybdenum, tungsten, manganese, etc. of the organic acids such as, for example, stearic acid, oleic acid, octoic acid, naphthenic acid, citric acid, acetyl acetonate, etc. are used as the catalyst in the hitherto-known method of preparing telomers. Of these metal salts of organic acids, the iron salts and the copper salts are in particular suitable.

According to the invention these metal salts of organic acids may be used in terms of the metal based on the telogens within the range of $1\times10^{-5}$–$1\times10^{-2}$ mol/mol, preferably $1\times10^{-3}$–$1\times10^{-2}$ mol/mol.

It was found moreover that according to the invention the metal salts of organic acids such as described above by being combined and used together with amines manifested very effective catalytic effects. These amines include the primary, secondary and tertiary amines of the aromatics and of aliphatics. Among them, those of particularly suitable are amines having at least one or more hydroxyl groups in their molecules such as triethanolamine, diethanolamine, monoethanolamine, dimethylethanolamine, etc.

According to the invention, when, as described hereinabove, the metal salts of organic acids and amines, particularly the amines having at least one hydroxyl group in their molecules were combined and used as catalysts, it was experimentally observed that the catalytic activity and catalytic life were markedly increased. While the reason therefor is not yet fully clear, we presume that it is due to the formation of the free radicals from the metal salts of organic acids being promoted by the presence of the amines, and at the same time, to the fact that said salts, in which free radicals had been formed, are reactivated again by said amines.

The quantities used of these amines based on the telogen is suitably within the range, for example, $1\times10^{-4}$–$1\times10^{-1}$ mol/mol, particularly $5\times10^{-3}$–$5\times10^{-3}$–$5\times10^{-2}$ mol/mol.

When the metal salts of organic acids are used in combination with the amines, such as mentioned hereinabove, as the catalyst in this invention, in view of the manifestation to a marked extent of the synergistic effects thereof, the amount used of the metal salts of organic acids may be less than the amount necessary when they are used alone. The range of the above amount based on the telogen in terms of the metal is suitably, for example, within $1\times10^{-6}$–$1\times10^{-2}$ mol/mol, particularly $1\times10^{-4}$–$1\times10^{-3}$ mol/mol.

Since, as described hereinabove, an organic peroxide is not used in this invention, it becomes unnecessary to restrict the reaction temperature in the present invention in the vicinity of 100° C., the temperature for initiating the reaction. In other words, there is the advantage that the telomerization reaction can be carried out at even low temperatures, as well as high temperatures. In addition, while there is a difference depending upon the taxogen used, when a taxogen that exhibits a gaseous state at room temperature, for example, such as ethylene, is used, it is usual that with an increase in the molar proportion of the taxogen to the telogen the pressure also increases. Also, expressing telogen as XY and taxogen as A, the telomer produced thereform is represented by $X(A)_nY$ (where $n$ is a positive integer), the value of $n$ being influenced by the molar proportion of the taxogen to the telogen. Hence, in case there is generally a necessity to increase the molar proportion of taxogen to telogen, as described above, that the reaction proceeds even at a low temperature as in the present invention is not only extremely advantageous as the reaction pressure can be reduced to an extremely lower degree, but also there is the advantage that under identical pressure conditions telomers having still higher molecular weight is possibly prepared.

Furthermore, since according to this invention the reaction can be carried out at relatively low pressures at either low or high temperatures, the risk of explosion and difficulties from an operational standpoint such as were incident to the conventional method could be eliminated.

As to achieving the contact between the reactants and the catalyst in this invention, the various known methods may be applied. Any of the methods can be employed such as, for example, as the standstill method, the batch process, or as the continuous method, the stirred flow method or the tubular method, etc.

Thus, according to the invention, for example, by placing in a reactor fully substituted with an inert gas a known telogen such as, for example, carbon tetrachloride, methanol, ethanol, isopropanol, butyl aldehyde or acetic acid, followed by adding a metal salt of an organic acid, for example, iron naphthenate or the mixture thereof with an amine, for example, triethanolamine, and by introducing under pressure the taxogen like, ethylene, followed by effecting the polymerization reaction at, for example, a temperature of −30–200° C. and a pressure of 0–150 atmospheres, the telogen solution of telomers is obtained. And, in this case, if a low temperature of below 0° C. is adopted as the reaction temperature, it becomes necessary that the telogen be suitably selected so that it may be one that does not freeze at such a temperature. From this solution the telomers are separated from the telogen by a known separation method, such as, for example, the distillation.

Therefore, according to the invention, telomers can be prepared very advantageously on a commercial scale by using as taxogens the unsaturated ethylenic compounds such as, for example, ethylene, propylene, butylene and isobutylene, the vinyl compounds such as vinyl chloride, vinyl acetate, vinyl ether, styrene and their alkyl or halogenated derivatives, and diene compounds such as butadiene, isoprene, etc.

In order to understand the present invention more clearly, the following specific examples are given, it being understood however that the same are merely intended in an illustrative sense, and the invention should not be limited thereby.

*Example 1*

A stirred autoclave was fully swept out with nitrogen gas and was charged according to the following recipe:

|  | Parts |
| --- | --- |
| Carbon tetrachloride | 476 |
| Triethanolamine | 1.65 |
| Iron naphthenate | [1] 0.034 |

[1] In terms of iron.

This was heated to 70° C. and ethylene was added up to 50 atmospheres. The pressure was maintained constantly by continuously supplying ethylene to make up for the decrease in pressure. After 4 hours the reaction was stopped, and the ethylene was separated. The conversion rate of the carbon tetrachloride determined by gas chromatography was 36.04% by weight. After separating carbon tetrachloride from the reaction product by means of distillation, 214 parts of telomers were obtained.

Upon separation of the resultant telomeric mixture by distillation, alkanes such as shown in the following table were obtained:

| $Cl(CH_2 \cdot CH_2)_n CCl_3$ | Boiling point (° C./mm. Hg) | Specific gravity ($d_4^{25}$) | Yield, parts | Weight percent |
| --- | --- | --- | --- | --- |
| n=1 | 58–61/24 | 1.4461 | 17.5 | 8.2 |
| n=2 | 111–113/24 | 1.3480 | 114.0 | 53.2 |
| n=3 | 92–94/2 | 1.2562 | 47.6 | 22.3 |
| n=4 | 120–124/2 | 1.1992 | 22.0 | 10.3 |
| n≥5 |  |  | 12.9 | 6.0 |

The chlorine content of the 1,1,1,5-tetrachloropentane was 67.5% (theoretical value 67.6%). 210 parts of this was taken, and after adding 420 parts of a 95% sulfuric acid, the mixture was heated to 80–90° C. An hour later, a mixture of 130 parts of sulfuric acid and 70 parts of water was added thereto, following which it was allowed to stand for another hour at 80–90° C. whereby was obtained mono-chloro valeric acid at a yield of 88%.

*Example 2*

An autoclave was charged according to the following recipe:

|  | Parts |
| --- | --- |
| Carbon tetrachloride | 476 |
| Triethanolamine | 1.65 |
| Iron naphthenate | [1] 0.034 |

[1] In terms of iron.

The polymerization reaction was effected by heating this to 50° C. and adding up to 50 atmospheres of ethylene. After 4 hours the reaction was stopped, and the ethylene was separated. The conversion rate of carbon tetrachloride determined by the gas chromatography was 26.5% by weight. The telomers obtained after separating carbon tetrachloride was 158 parts.

*Example 3*

An autoclave swept out with nitrogen was charged with 476 parts of carbon tetrachloride, 1 part of dimethyl ethanolamine and, 0.034 part of iron naphthenate (in terms of iron).

The reaction was carried out for 4 hours by heating this to 50° C. and adding ethylene gas up to 50 atmospheres. The reaction was stopped, the ethylene gas was discharged, the conversion rate of carbon tetrachloride determined by the gas chromatography being 18.9% by weight. The quantity of telomers obtained after separating carbon tetrachloride by distillation was 90 parts.

*Example 4*

A stirred autoclave was charged with 476 parts of carbon tetrachloride and, 0.16 part (in terms of iron) of iron naphthenate, and the reaction was carried out by adding up to 50 atmospheres of ethylene gas. After 4 hours the reaction was stopped, and the ethylene gas was separated and discharged. When analytically determined by the gas chromatography, a value of 16.2% was obtained. The quantity of telomers obtained after separating carbon tetrachloride by distillation was 96 parts.

*Example 5*

476 parts of carbon tetrachloride, 0.035 part (in terms of iron) of iron stearate and 1.5 parts of diethanolamine were placed in a reactor.

This mixture was heated to 50° C., and the ethylene gas was added up to 50 atmospheres. The decrease in the pressure that occurred in concomitance as the reaction proceeded was prevented by the constant replenishment of the ethylene gas whereby the pressure was maintained at 50 atmospheres during the reaction which was carried out for 3 hours.

After completing the reaction and after having cooled the reactor, the ethylene gas was discharged. When the conversion rate of carbon tetrachloride was determined by the gas chromatography, a value of 35% by weight was obtained. And after separating carbon tetrachloride by distillation, 203.8 parts of a telomeric solution was obtained.

*Example 6*

476 parts of carbon tetrachloride, 0.017 part (in terms of iron) of iron stearate and 1.65 parts of triethanolamine were placed in a reactor, which was then heated to 50° C. To this was introduced the ethylene gas under a pressure of up to 60 atmospheres, which pressure was constantly maintained during the reaction. The reaction was stopped after 2 hours, the reactor cooled to below 20° C. and the ethylene gas was gradually discharged. When the conversion rate of carbon tetrachloride was determined by the gas chromatography, a value of 26% by weight was obtained. By distillation, alkanes were separated to give the following composition.

| $Cl(CH_2 \cdot CH_2)_n CCl_3$ | Boiling point (° C./mm. Hg) | Specific gravity ($d_4^{25}$) | Yield, parts | Weight percent |
|---|---|---|---|---|
| $n=1$ | 58–60/24 | 1.4460 | 15.4 | 10.0 |
| $n=2$ | 111–113/24 | 1.3413 | 91.0 | 58.4 |
| $n=3$ | 92–94/2 | 1.2541 | 32.5 | 21.0 |
| $n=4$ | 120–123/2 | 1.1943 | 12.2 | 7.9 |
| $n \geq 5$ | | | 4.1 | 2.7 |
| Total | | | 155.2 | |

*Example 7*

A stirred autoclave was charged with 795 parts of carbon tetrachloride followed by the addition of 0.03 part (in terms of iron) of an iron salt of octoic acid and 2.75 parts of triethanolamine. The temperature was held at 50° C. while ethylene was maintained at 50 atmospheres.

After 3 hours the reaction was stopped, the autoclave was cooled and the ethylene gas was separated. When the conversion rate of carbon tetrachloride was measured, a value of 22.3% was obtained. When this reaction product was fractionally distilled, the following alkanes were obtained:

| $Cl(CH_2 \cdot CH_2)_n CCl_3$ | Boiling point (° C./mm. Hg) | Specific gravity ($d_4^{25}$) | Yield, parts | Weight percent |
|---|---|---|---|---|
| $n=1$ | 58–60/24 | 1.4461 | 24.8 | 11.2 |
| $n=2$ | 110–114/24 | 1.3412 | 114.0 | 51.5 |
| $n=3$ | 92–93/2 | 1.2540 | 40.5 | 18.3 |
| $n=4$ | 120–122/2 | 1.1942 | 25.4 | 11.5 |
| $n \geq 5$ | | | 16.3 | 7.5 |
| Total | | | 221.0 | |

*Example 8*

476 parts of carbon tetrachloride, 1.65 parts of triethanolamine and 0.034 part (in terms of iron) of an iron salt of oleic acid were placed in a reactor, and while maintaining a temperature of 50° C. and with stirring ethylene was fed in a manner as to maintain constantly 50 atmospheres, this state being maintained for 4 hours. The conversion rate of carbon tetrachloride of 27.2% by weight was obtained, and 164.5 parts of a solution of mixed alkanes was obtained. The composition of tetrachloroalkane obtained by fractional distillation was as follows:

| $Cl(CH_2 \cdot CH_2)_n CCl_3$ | Yield, parts | Weight percent |
|---|---|---|
| $n=1$ | 18.3 | 11.2 |
| $n=2$ | 81.2 | 49.5 |
| $n=3$ | 31.8 | 19.4 |
| $n=4$ | 18.2 | 11.1 |
| $n \geq 5$ | 15.0 | 8.8 |
| Total | 164.5 | |

*Example 9*

An autoclave was charged with 476 parts of carbon tetrachloride, 1.65 parts of triethanolamine and 0.085 part (in terms of cobalt) of cobalt naphthenate and was heated to 50° C. To this was added the ethylene gas, which was maintained constantly at 50 atmospheres, and the reaction was carried out for 2 hours. The conversion rate of carbon tetrachloride was 7.5% by weight, and the quantity of telomeric solution obtained was 44.8 parts.

*Example 10*

A stirred autoclave was charged with 795 parts of carbon tetrachloride, 2.75 parts of triethanolamine and 0.087 part (in terms of lead) of lead naphthenate, and was heated to 50° C. To this was introduced ethylene, which, by replenishment, was constantly maintained at 50 atmospheres. As a result of 4 hours' reaction, 81.3 parts of a telomeric solution was obtained.

*Example 11*

An autoclave was charged with 476 parts of carbon tetrachloride, 1.15 parts of aminoethylethanolamine and 0.035 part (in terms of iron) of iron naphthenate, and was heated to 50° C. Ethylene gas was fed constantly to this as to maintain a pressure at 50 atmospheres, and the reaction was carried out for 6 hours. After completion of the reaction, the autoclave was cooled, and the unreacted ethylene gas was separated. When the conversion rate of carbon tetrachloride was measured, it was 48.2% by weight. This telomeric solution was fractionated and a total of 278 parts of alkanes were obtained as follows:

| $Cl(CH_2 \cdot CH_2)_n CCl_3$ | Yield, parts | Weight percent |
|---|---|---|
| $n=1$ | 34.2 | 12.3 |
| $n=2$ | 161.5 | 58.1 |
| $n=3$ | 42.5 | 15.3 |
| $n=4$ | 22.8 | 8.2 |
| $n \geq 5$ | 17.0 | 6.1 |
| Total | 278.0 | |

*Example 12*

An autoclave was charged with 476 parts of carbon tetrachloride, 1.67 parts of triethanolamine and 0.034 part (in terms of iron) of iron naphthenate. After adding further 136 parts of propylene, it was heated to 40° C., and reacted for 2 hours. The conversion rate of carbon tetrachloride was 13.8%. Upon the fractional distillation, 63 parts of 1,1,1,3-tetrachlorobutane and 5 parts of 1,1,1,5-tetrachloro-3-methylhexane were obtained.

*Example 13*

In a reactor was placed 476 parts of carbon tetrachloride and 192 parts of vinyl acetate, and as the catalyst 1.67 parts of triethanolamine and 0.034 part (in terms of iron) of iron naphthenate. This was then heated to 45° C. and the reaction was carried out for 10 hours.

210 parts of telomers were obtained. When this was distilled under reduced pressure at relatively low temperature, the following composition were obtained:

| $Cl_3C[CH_2 \cdot CH(OAc)]_n Cl$ | | Yield, parts | Weight percent |
|---|---|---|---|
| $n=1$ | $Cl_3C[CH_2 \cdot CH(OAc)]Cl$ | 109 | 52 |
| $n=2$ | $Cl_3C[CH_2 \cdot CH(OAc)]_2Cl$ | 84 | 40 |
| $n \geq 3$ | $Cl_3C[CH_2 \cdot CH(OAc)]_3Cl$ | 15.8 | 8 |
| Total | | 208.8 | |

NOTE.—In the above table. OAc stands for $-O \cdot \underset{\underset{O}{\|}}{C} \cdot CH_3$.

*Example 14*

An autoclave was charged with 476 parts of carbon tetrachloride, 125 parts of vinyl chloride, 1.15 part of aminoethylethanolamine, and also 0.035 part (in terms of iron) of iron naphthenate, and then heated to 50° C. The reaction was carried out for 3 hours followed by the rectification whereby were separated telomers having the following composition:

| $Cl_3C[CH_2 \cdot CH(Cl)]_n Cl$ | | Yield, parts | Weight Percent |
|---|---|---|---|
| $n=1$ | $Cl_3C[CH_2 \cdot CH(Cl)] \cdot Cl$ | 113 | 62 |
| $n=2$ | $Cl_3C[CH_2 \cdot CH(Cl)]_2Cl$ | 69.2 | 38 |
| Total | | 182.2 | |

*Example 15*

An autoclave was charged with 476 parts of carbon tetrachloride and 130 parts of 1-butene followed by addition of 1.65 parts of triethanolamine and 0.034 part (in terms of iron) of iron naphthenate as the catalyst. This was then heated to 50° C. and reacted for 4 hours. The conversion rate of carbon tetrachloride was 19.5% by weight, and the quantity of telomers obtained was 102 parts.

*Example 16*

When in lieu of the 1-butene of Example 15 as above, 130 parts of isobutene was added, the conversion rate of carbon tetrachloride after a reaction for 3 hours at 50° C. was 18.2% by weight, and the quantity of telomers obtained was 95 parts.

*Example 17*

An autoclave was charged with 237 parts of methanol and also as the catalyst with 2.74 parts of aminoethylethanolamine and 0.081 part (in terms of iron) of iron naphthenate. It was then heated to 50° C. and ethylene was introduced until the pressure reached up to 50 atmospheres where it was maintained constant while the reaction was continued for 5 hours.

19 parts of telomers were obtained, about 80% of which being telomer in which $n=1$, i.e., propyl alcohol and the remainder being amyl alcohol.

*Example 18*

An autoclave was charged with 240 parts of ethanol, 2.77 parts of triethanolamine and 0.057 part (in terms of iron) of iron naphthenate, and was heated to 50° C.

After a uniform temperature was reached, the ethylene gas was added as to become 50 atmospheres, and the reaction was continued for 5 hours. The unreacted alcohol amounted to 90%.

*Example 19*

234 parts of isopropanol, 2.08 parts of triethanolamine and 0.043 part (in terms of iron) of iron naphthenate were poured into an autoclave which was then heated to 50° C. To this was introduced ethylene as to become 50 atmospheres, and the reaction was carried out for 5 hours whereby was obtained telomers having the following composition:

| $n$ | $H(CH_2 \cdot CH_2)_n(OH)C(CH_3)_2$ | Yield, parts | Weight percent |
|---|---|---|---|
| 1 | $H(CH_2 \cdot CH_2)(OH)C(CH_3)_2$ | 8.5 | 34.0 |
| 2 | $H(CH_2 \cdot CH_2)_2(OH)C(CH_3)_2$ | 7.5 | 30.2 |
| 3 | $H(CH_2 \cdot CH_2)_3(OH)C(CH_3)_2$ | 5.4 | 21.5 |
| $\geq 4$ | $H(CH_2 \cdot CH_2)_{\geq 4}(OH)C(CH_3)_2$ | 3.6 | 14.3 |
| Total | | 25.0 | |

*Example 20*

An autoclave was charged with 240 parts of butyl aldehyde, 1.76 parts of triethanolamine and 0.037 part (in terms of iron) of iron naphthenate, and was heated to 50° C. 50 atmospheres of ethylene was introduced, and while maintaining a constant pressure the reaction was carried out for 5 hours. The quantity of telomers obtained was 28 parts, the composition thereof being chiefly telomers in which $n=1$.

*Example 21*

When ethylene was used as the taxogen and acetic acid as the telogen, the result was as follows: To 315 parts of acetic acid were added 2.8 parts of triethanolamine and 0.058 part (in terms of iron) of iron naphthenate, which was then heated to 60° C. Ethylene was introduced thereinto up to 50 atmospheres, and the reaction was carried out for 3 hours.

The quantity of telomers obtained was 12 parts, which were practically all telomers in which $n=1$.

*Example 22*

The reactor used was a tubular high-pressure reactor, 15 meters in length, which was installed inside of a thermostatically controlled water tank. Ethylene was introduced into a solubilization tank at a constant rate by means of a compressor while simultaneously a triethanolamine carbon tetrachloride solution was fed to the solubilization tank at a constant rate of flow by means of a pump and dissolved uniformly. This solution was continuously introduced under pressure to the tubular reactor by means of a second pump. In the meantime, a carbon tetrachloride solution containing iron naphthenate was directly introduced under pressure to the tubular reactor by means of a pump.

The temperature within the reactor was maintained at a given temperature by maintaining the temperature of the thermostatically controlled water tank constant by means of a steam regulating valve. While the reaction pressure was maintained constant by means of an automatic pressure regulating valve fitted at the extremity of the reactor, the liquid thus formed after the reaction was discharged, after which the gas and the liquid were separated and a telomeric solution was obtained. This was rectified and separated into telomers and carbon tetrachloride. The reaction temperature used was 50° C.

The composition of the fed liquid was as follows:

Ethylene _____kg./hr__  1.5
Total carbon tetrachloride _____kg./hr__  4.8
Triethanolamine _____g./hr__   16.5
Iron naphthenate _____g./hr__ [1] 0.34

[1] In terms of iron.

The reaction pressure employed, as liquid pressure, was 70 kg./cm.² The molar proportion of ethylene to carbon tetrachloride was 1.75. The average residence time in the reactor was 2 hours. The reaction-completed liquid, when analyzed, was as follows:

| $Cl(CH_2 \cdot CH_2)_n CCl_3$ | Yield (kg./hr) | Weight percent |
|---|---|---|
| $n=1$ | 0.093 | 8.9 |
| $n=2$ | 0.573 | 54.5 |
| $n=3$ | 0.182 | 17.3 |
| $n=4$ | 0.110 | 10.5 |
| $n \geq 5$ | 0.093 | 8.8 |
| Total | 1.051 | |

*Example 23*

A stirred autoclave was charged with 476 parts of carbon tetrachloride and 136 parts of propylene, and successively with 0.038 part of copper naphthenate (in terms of copper) and 1.67 parts of triethanolamine. The reaction was carried out for 2 hours by maintaining the temperature in the autoclave at 50° C. By applying the separation, telomers was found as being consisted of 71 parts of 1,1,1,3-tetrachlorobutane (namely, in case of $n=1$), 7 parts of 1,1,1,5-tetrachlor-3-methylhexane (namely, in case of $n=2$) and 5 parts of telomer in which $n$ was 3 or more.

*Example 24*

A stirred autoclave was fully swept out with nitrogen gas, and the raw materials as well as the catalyst were charged therein according to the following recipe:

Parts
Carbon tetrachloride _____  476
Triethanolamine _____   1.67
Copper naphthenate _____ [1] 0.019

[1] In terms of copper.

The reaction was carried out by maintaining the temperature in the autoclave at 50° C. and feeding ethylene continuously so that the pressure weight be maintained at 50 atms. After 3 hours, the reaction was stopped, and ethylene as well as unreacted carbon tetrachloride were separated. By fractioning telomers prepared, the following chloroalkanes were obtained.

| $Cl(CH_2 \cdot CH_2)_n CCl_3$ | Yield, parts | Weight percent |
|---|---|---|
| n=1 | 15.7 | 11.0 |
| n=2 | 74.0 | 51.7 |
| n=3 | 31.9 | 22.3 |
| n=4 | 12.0 | 8.4 |
| n≧5 | 9.4 | 6.6 |
| Total | 143.0 |  |

Examples 26–38

In the following table are shown further examples whereby telomers are obtained according to the invention using various other metallic salts of organic acids. (Note particularly that Example 38 in the table is that illustrating the telomerization of butadiene according to the invention.)

| Example | Telogen | Taxogen | Metallic salt of organic acid | Amine | Temperature (° C.) | Pressure (atms.) | Time (hrs.) | Product (parts) |
|---|---|---|---|---|---|---|---|---|
| 26 | CCl₄, 476 pt | Ethylene | Lithium naphthenate, 0.005 pt. (in term of Li). | Triethanolamine, 1.65 pt. | 50 | 50 | 4 | 29 |
| 27 | CCl₄, 476 pt | do | Magnesium naphthenate, 0.015 pt. (in term of Mg). | do | 50 | 50 | 5 | 30 |
| 28 | CCl₄, 476 pt | do | Aluminum naphthenate, 0.016 pt. (in term of Al). | do | 50 | 50 | 4 | 43 |
| 29 | CCl₄, 476 pt | Propylene, 136 | Lithium naphthenate, 0.005 pt. (in term of Li). | do | 50 | 50 | 3 | 48 |
| 30 | CCl₄, 476 pt | do | Sodium naphthenate, 0.013 pt. (in term of Na). | do | 50 | 50 | 3 | 45 |
| 31 | CCl₄, 476 pt | do | Magnesium naphthenate, 0.015 pt. (in term of Mg). | do | 50 | 50 | 3 | 28 |
| 32 | CCl₄, 476 pt | do | Zinc naphthenate, 0.020 pt. (in term of Zn). | Triethanolamine, 1.67 pt. | 50 | 50 | 3 | 40 |
| 33 | CCl₄, 476 pt | do | Cadmium naphthenate, 0.039 pt. (in term of Cd). | do | 50 | 50 | 3 | 30 |
| 34 | CCl₄, 476 pt | do | Aluminum naphthenate, 0.016 pt. (in term of Al). | Triethanolamine, 1.65 pt. | 50 | 50 | 4 | 37 |
| 35 | CCl₄, 476 pt | do | Titanium naphthenate, 0.015 pt. (in term of Ti). | Triethanolamine, 1.67 pt. | 50 | 50 | 3 | 38 |
| 36 | CCl₄, 476 pt | do | Chromium naphthenate, 0.016 pt. (in term of Cr). | do | 50 | 50 | 3 | 38 |
| 37 | CCl₄, 476 pt | do | Manganese naphthenate, 0.033 pt. (in term of Mn). | Triethanolamine, 1.65 pt. | 50 | 50 | 4 | 40 |
| 38 | CCl₄, 476 pt | Butadiene, 130 pt | Iron naphthenate, 0.034 pt. (in term of Fe). | Triethanolamine, 1.67 pt. | 50 | 50 | 3 | 98 |

Example 25

[Relationship between the type of amine and conversion rate of CCl₄]

It can be said that as the amine to be incoporated in combination with the catalyst comprising the metal salts of organic acids those having at least one or more hydroxyl groups in their molecules are to be preferred, and also that there is an intimate relationship between the basicity of the amine and its catalysis accelerating effects. Letting the parameter of this basicity be $pK_b$, then $pK_b = 4-10$. Thus, preferably amino alcohols within the range of 5–7 are most suitable. Of these amines, several examples of those which were particularly effective in promoting the reaction are given below.

Name of amine: CCl₄ conversion rate (percent)
Aminoethylethanolamine;
  $NH_2(CH_2)_2NH(CH_2)_2OH$ _____ 33.8
Aminoethylisopropanolamine;
  $NH_2(CH_2)_2NHCH_2CH(OH)CH_3$ _____ 18.2
Triethanolamine; $N(CH_2CH_2OH)_3$ _____ 25.0
Diethanolamine; $NH(CH_2CH_2OH)_2$ _____ 20.0
Diethylethanolamine;
  $(C_2H_5)_2N(CH_2CH_2OH)$ _____ 16.8
Isopropanolamine; $NH_2CH_2CH(OH)CH_3$ ___ 15.7
Dimethylethanolamine;
  $(CH_3)_2N(CH_2CH_2OH)$ _____ 10.0
Monoethanolamine; $NH_2(CH_2 \cdot CH_2OH)$ ____ 8.0
Triisopropanolamine; $N(CH_2CH(OH)CH_3)_3$ _ 8.0
N-ethylethanolamine;
  $C_2H_4NH(CH_2 \cdot CH_2OH)$ _____ 5.4
N-methylethanolamine;
  $CH_3NHCH_2CH_2OH$ _____ 5.4

(The foregoing results were obtained by changing the type of amine to be added to the iron naphthenate under the reaction condition as described in Example 2 and seeking the conversion rate of carbon tetrachloride 2 hours after the start of the experiment.)

Having thus set forth the invention, what is claimed is:

1. A method of preparing telomers comprising reacting a taxogen selected from the groups consisting of ethylene, propylene, butylene, isobutylene, vinyl chloride, vinyl acetate, styrene, butadiene and isoprene with a telogen selected from a group consisting of chloroform, carbon tetrachloride, methanol, ethanol, isopropanol, butyraldehyde and acetic acid in the presence of a catalyst comprising a metal salt of an acid selected from the group consisting of naphthenic acid, stearic acid, oleic acid, octoic acid and citric acid, and separating the resultant telomers, the cation of said metal salt being a metal selected from a group consisting of Li, K, Na, Mg, Ca, Al, Cu, Fe, Ni, Co, Pb, Zn, Cd, Sn, Ti, Zr, V, Cr, Mo, Mn and W.

2. The method according to claim 1 wherein said catalyst includes an amine selected from a group consisting of lower alkanol amines, N-lower alkyl lower alkanol amines and N-amino lower alkyl lower alkanol amines.

3. The method according to claim 1 wherein said metal salt catalyst is present in an amount corresponding to provide from about $1 \times 10^{-6}$ to about $1 \times 10^{-2}$ mol of said metal per mol of said telogen.

4. The method in accordance with claim 2 wherein said amine is present in an amount in the range of from about $1 \times 10^{-4}$ to about $1 \times 10^{-1}$ mol per mol of said telogen.

5. The method in accordance with claim 1 wherein said reaction is carried out at a temperature in the range of from about −30° C. to about 200° C.

6. The method in accordance with claim 1 wherein said reaction is carried out under a pressure in the range from about 0 to about 150 atmospheres.

7. The method in accordance with claim 1 wherein said taxogen is ethylene.

8. The method in accordance with claim 1 wherein said telogen is carbon tetrachloride.

9. The method in accordance with claim 1 wherein said metal salt catalyst is iron naphthenate.

10. The method in accordance with claim 2 wherein said amine is triethanolamine.

11. The method in accordance with claim 2 wherein said amine is aminoethylethanolamine.

12. The method in accordance with claim 2 wherein said taxogen is ethylene, said telogen is carbon tetrachloride, said metal salt catalyst is iron naphthenate and said amine is triethanolamine.

References Cited by the Examiner
UNITED STATES PATENTS

| | | | |
|---|---|---|---|
| 2,402,137 | 6/46 | Hanford et al. | 260—488 |
| 2,432,287 | 12/47 | Cramer | 260—597 |
| 2,440,800 | 5/48 | Hanford et al. | 260—597 |
| 3,016,406 | 1/62 | Brace | 260—487 X |

LORRAINE A. WEINBERGER, *Primary Examiner.*

ABRAHAM H. WINKELSTEIN, HAROLD G. MOORE, *Examiners.*

Notice of Adverse Decision in Interference

In Interference No. 95,536 involving Patent No. 3,213,149, A. Takahashi, N. Mogi, and H. Takahama, METHOD OF PREPARING TELOMERS, final judgment adverse to the patentees was rendered July 25, 1968, as to claims 2 and 10.

[*Official Gazette December 17, 1968.*]